US007531613B2

(12) United States Patent
Williams et al.

(10) Patent No.: US 7,531,613 B2
(45) Date of Patent: May 12, 2009

(54) INORGANIC-ORGANIC NANOCOMPOSITE

(75) Inventors: David A. Williams, Gansevoort, NY (US); Vikram Kumar, Bangalore (IN); Edward J. Nesakumar, Bangalore (IN); Indumathi Ramakrishnan, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 151 days.

(21) Appl. No.: 11/336,948

(22) Filed: Jan. 20, 2006

(65) Prior Publication Data
US 2007/0173598 A1 Jul. 26, 2007

(51) Int. Cl.
C08G 77/26 (2006.01)
C08G 77/02 (2006.01)
C08K 3/34 (2006.01)

(52) U.S. Cl. .................... 528/38; 524/588; 524/436
(58) Field of Classification Search ................. 524/436; 528/38
See application file for complete search history.

(56) References Cited

U.S. PATENT DOCUMENTS

| 2,920,095 A | 1/1960 | Clarence et al. |
| 4,131,589 A | 12/1978 | Smith, Jr. |
| 4,533,714 A | 8/1985 | Sebag et al. |
| 4,699,940 A | 10/1987 | Gerace et al. |
| 4,710,411 A | 12/1987 | Gerace et al. |
| 4,833,225 A | 5/1989 | Schaefer et al. |
| 4,891,166 A | 1/1990 | Schaefer et al. |
| 4,892,918 A | 1/1990 | Ryang |
| 5,026,890 A | 6/1991 | Webb et al. |
| 5,094,831 A | 3/1992 | Klockner et al. |
| 5,120,379 A | 6/1992 | Noda et al. |
| 5,130,396 A | 7/1992 | Panster et al. |
| 5,567,530 A | 10/1996 | Drujon et al. |
| 5,576,054 A | 11/1996 | Brown |
| 5,591,818 A * | 1/1997 | Standke et al. ................ 528/38 |
| 5,653,073 A | 8/1997 | Palmer |
| 5,665,368 A * | 9/1997 | Lentini et al. ................ 424/401 |
| 5,760,121 A | 6/1998 | Beall et al. |
| 5,804,253 A | 9/1998 | Hagiwara et al. |
| 5,849,832 A | 12/1998 | Virnelson et al. |
| 5,853,886 A * | 12/1998 | Pinnavaia et al. ........... 428/403 |
| 5,855,972 A | 1/1999 | Kaeding |
| 5,866,645 A * | 2/1999 | Pinnavaia et al. ........... 524/443 |
| 5,993,769 A * | 11/1999 | Pinnavaia et al. ........... 423/331 |
| 6,055,783 A | 5/2000 | Guhl et al. |
| 6,096,803 A * | 8/2000 | Pinnavaia et al. ........... 523/209 |
| 6,136,446 A | 10/2000 | Virnelson et al. |
| 6,136,910 A | 10/2000 | Virnelson et al. |
| 6,150,425 A * | 11/2000 | Sekine et al. ................ 516/22 |
| 6,150,441 A | 11/2000 | Chiba et al. |
| 6,225,394 B1 | 5/2001 | Lan et al. |
| 6,232,388 B1 | 5/2001 | Lan et al. |
| 6,238,755 B1 | 5/2001 | Harvey et al. |
| 6,262,162 B1 | 7/2001 | Lan et al. |
| 6,284,360 B1 | 9/2001 | Johnson et al. |
| 6,301,858 B1 | 10/2001 | Crandell |
| 6,372,827 B2 | 4/2002 | Johnson et al. |
| 6,376,591 B1 | 4/2002 | Lan et al. |
| 6,380,295 B1 | 4/2002 | Ross et al. |
| 6,387,996 B1 | 5/2002 | Lan et al. |
| 6,391,449 B1 | 5/2002 | Lan et al. |
| 6,399,690 B2 | 6/2002 | Lan et al. |
| 6,406,782 B2 | 6/2002 | Johnson et al. |
| 6,407,155 B1 | 6/2002 | Qian et al. |
| 6,410,635 B1 * | 6/2002 | Kaylo et al. ................ 524/447 |
| 6,445,158 B1 | 9/2002 | Bertness et al. |
| 6,457,294 B1 | 10/2002 | Virnelson et al. |
| 6,486,253 B1 | 11/2002 | Gilmer et al. |
| 6,521,690 B1 | 2/2003 | Ross et al. |
| 6,596,803 B2 | 7/2003 | Lan et al. |
| 6,653,388 B1 | 11/2003 | Barbee et al. |
| 6,686,002 B2 | 2/2004 | Auerbach |
| 6,713,547 B2 | 3/2004 | Barbee et al. |
| 6,730,766 B2 | 5/2004 | Schattenmann et al. |
| 6,784,272 B2 | 8/2004 | Mack et al. |
| 6,787,592 B1 | 9/2004 | Powell et al. |
| 6,796,102 B2 | 9/2004 | Virnelson et al. |
| 6,803,412 B2 | 10/2004 | Nguyen-Misra et al. |
| 6,812,272 B2 | 11/2004 | Fischer |
| 6,822,035 B2 | 11/2004 | Chaiko |
| 6,828,370 B2 | 12/2004 | Lan et al. |
| 6,828,403 B2 | 12/2004 | Mahdi et al. |
| 6,858,665 B2 | 2/2005 | Larson |

(Continued)

FOREIGN PATENT DOCUMENTS

EP 0520777 12/1992

(Continued)

OTHER PUBLICATIONS

Kaneko et al., Chem. Lett. vol. 33, 2004, pp. 1486-1487.*

(Continued)

Primary Examiner—Randy Gulakowski
Assistant Examiner—Robert Loewe
(74) Attorney, Agent, or Firm—Dominick G. Vicari

(57) ABSTRACT

The present invention relates to improved nanocomposite compositions and methods for making and using the same. This invention also relates to the use of these inorganic-organic nanocomposite in compositions, for example, coatings, sealants, caulks, adhesives, and as additives for solid polymer-containing compositions.

34 Claims, No Drawings

U.S. PATENT DOCUMENTS

| | | |
|---|---|---|
| 6,881,798 B2 | 4/2005 | Choi et al. |
| 6,887,931 B2 | 5/2005 | Twardowska et al. |
| 6,889,480 B2 | 5/2005 | Guhl et al. |
| 6,914,095 B2 | 7/2005 | Lorah et al. |
| 2002/0091186 A1 | 7/2002 | Auerbach |
| 2002/0100550 A1 | 8/2002 | Mahdi et al. |
| 2002/0119266 A1 | 8/2002 | Bagrodia et al. |
| 2002/0165305 A1* | 11/2002 | Knudson et al. ............ 524/445 |
| 2002/0194813 A1 | 12/2002 | Virnelson et al. |
| 2003/0095906 A1* | 5/2003 | Bauer et al. ................ 423/333 |
| 2004/0127629 A1 | 7/2004 | Jacob et al. |
| 2004/0149370 A1 | 8/2004 | Auerbach |
| 2004/0171482 A1* | 9/2004 | Pinnavaia et al. .......... 502/158 |
| 2004/0180154 A1 | 9/2004 | Wang et al. |
| 2004/0180155 A1 | 9/2004 | Nguyen-Misra |
| 2004/0188016 A1 | 9/2004 | Mahdi et al. |
| 2004/0210074 A1* | 10/2004 | Hupfield et al. ............. 556/413 |
| 2004/0229751 A1* | 11/2004 | Pinnavaia et al. .......... 502/140 |
| 2005/0113498 A1 | 5/2005 | Auerbach |
| 2005/0187305 A1* | 8/2005 | Briell ........................ 516/110 |
| 2005/0192387 A1 | 9/2005 | Williams et al. |
| 2005/0203235 A1 | 9/2005 | Gong et al. |
| 2005/0249033 A1 | 11/2005 | Krause |
| 2006/0199890 A1* | 9/2006 | Fasulo et al. ................ 524/445 |
| 2007/0116907 A1 | 5/2007 | Landon et al. |
| 2007/0117926 A1 | 5/2007 | Landon et al. |
| 2007/0160781 A1 | 7/2007 | Landon et al. |
| 2007/0173596 A1 | 7/2007 | Landon et al. |
| 2007/0173597 A1* | 7/2007 | Williams et al. ............ 524/588 |
| 2007/0178256 A1 | 8/2007 | Landon |
| 2007/0178257 A1 | 8/2007 | Landon |
| 2007/0179236 A1 | 8/2007 | Landon |
| 2007/0179242 A1 | 8/2007 | Landon |
| 2008/0020154 A1 | 1/2008 | Landon et al. |

FOREIGN PATENT DOCUMENTS

| | | |
|---|---|---|
| EP | 0857761 | 8/1998 |
| GB | 2249552 | 5/1992 |
| JP | 06-287014 | 10/1994 |
| WO | WO 97/15619 | 5/1997 |
| WO | WO 97/31057 | 8/1997 |
| WO | WO 02064676 | 8/2002 |
| WO | WO 2004/056913 A1 | 7/2004 |
| WO | 2005/066261 | 7/2005 |
| WO | WO 2007/081898 A1 | 7/2007 |

OTHER PUBLICATIONS

Johnson et al. Langmuir, vol. 6, 1990, pp. 307-311.*
Johnson et al., Langmuir, vol. 7, 1991, pp. 2636-2641.*
Peter C. LeBaron et al., "Clay Nanolayer Reinforcement of a Silicone Elastomer", 2001.
Shelly D. Burnside et al., "Nanostructure and Properties of Polysiloxane-Layered Silicate Nanocomposites", Mar. 28, 2000.
K. Mizoguchi et al., "Miscibility and gas permeability of poly (ethylene-co-5,4 mol%3,5,5-trimethylhexyl methacrylate)-polydimethyl-siloxane blends", 1997.
Y. Geerts et al., "Morphology and Permeability of Polymer Blends-1. Crosslinked EPDM-Silicone Blends", 1996.

* cited by examiner

INORGANIC-ORGANIC NANOCOMPOSITE

FIELD OF THE INVENTION

The present invention relates generally to improved nanocomposite compositions and methods for making and using the same. More particularly, the present invention relates to inorganic-organic nanocomposites and processes for their preparation. This invention also relates to the use of these inorganic-organic nanocomposite compositions in, for example, coatings, sealants, caulks, adhesives, and plastics.

BACKGROUND OF THE INVENTION

Inorganic-organic nanocomposites can exhibit mechanical properties superior to those of their separate components. To optimize the performance properties of these materials, it is usually desirable to disperse the inorganic components in the organic matrix on a nanometer length scale. Clays and other layered inorganic materials that can be broken down into nanoscale building blocks are useful for the preparation of inorganic-organic nanocomposites.

The addition of clay materials to polymers is known in the art, however, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. The affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength and uniformity of the composition by having pockets of clay concentrated, rather than uniformly dispersed, throughout the polymer. Affinity between clays and polymers is related to the fact that clays, by nature, are generally hydrophillic whereas polymers are generally hydrophobic.

Clay minerals are typically comprised of hydrated aluminum silicates that are fine-grained and have a platy habit. The crystalline structure of a typical clay mineral is a multi-layered structure comprised of combinations of layers of $SiO_4$ tetrahedra that are joined to layers of $AlO(OH)_2$ octahedra. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

In order to promote more affinity between the clay and the polymer at the interface and provide a uniform dispersion of the clay within the polymer, the interlayer surface chemistry of the clay may be modified to render the silicate layers less hydrophilic.

Alkylammonium ions, such as onium salts, are commonly used to prepare clay dispersions for nanocomposite materials. The basic formula for a typical alkylammonium ion is $CH_3-(CH_2)_n-NH_3^+$ where n is from 1 to 18. It is believed that the alkylammonium ions also readily exchange with the naturally occurring cations present between the clay platelets resulting in an intercalated state. Further, it is believed that the alkylammonium ions may increase the space between the clay layers and also may lower the surface energy of the clay thereby allowing organic species with different polarities to become intercalated between the clay layers.

A need exists for nanocomposites having improved properties. The invention disclosed herein provides a cost effective and efficient process for the production of novel inorganic-organic nanocomposite compositions that are is especially suitable for use in sealants with the desired characteristics of softness, processability and elasticity are important performance criteria.

SUMMARY OF THE INVENTION

In accordance with the present invention, an inorganic-organic nanocomposite is provided which comprises at least one inorganic component which is a layered inorganic nanoparticulate and at least one organic component which is a quaternary ammonium organopolysiloxane.

The novel inorganic-organic nanocomposite of the invention can be used as a filler for a wide variety of polymer resin containing compositions and, in particular, as filler for such compositions intended for application as sealants, coatings and adhesives.

DETAILED DESCRIPTION OF THE INVENTION

In accordance with the present invention, an inorganic-organic nanocomposite is provided comprising at least one inorganic component which is a layered inorganic nanoparticulate and at least one organic component which is quaternary ammonium organopolysiloxane. When describing the invention, the following terms have the following meanings, unless otherwise indicated.

Definitions

The term "exfoliation" as used herein describes a process wherein packets of nanoclay platelets separate from one another in a polymer matrix. During exfoliation, platelets at the outermost region of each packet cleave off, exposing more platelets for separation.

The term "gallery" as used herein describes the space between parallel layers of clay platelets. The gallery spacing changes depending on the nature of the molecule or polymer occupying the space. An interlayer space between individual nanoclay platelets varies, again depending on the type of molecules that occupy the space.

The term "intercalant" as used herein includes any inorganic or organic compound capable of entering the clay gallery and bonding to its surface.

The term "intercalate" as used herein designates a clay-chemical complex wherein the clay gallery spacing has increased due to the process of surface modification. Under the proper conditions of temperature and shear, an intercalate is capable of exfoliating in a resin matrix.

As used herein, the term "intercalation" refers to a process for forming an intercalate.

The expression "inorganic nanoparticulate" as used herein describes layered inorganic material, e.g., clay, with one or more dimensions, such as length, width or thickness, in the nanometer size range and which is capable of undergoing ion exchange.

The expression "modified clay" as used herein designates a clay material, e.g., nanoclay, which has been treated with any inorganic or organic compound that is capable of undergoing ion exchange reactions with the cations present at the interlayer surfaces of the clay.

The term "nanoclay" as used herein describes layered clay materials that possess a unique morphology with one dimension being in the nanometer range. Nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

As used herein, the term "nanoparticulate" refers to particle sizes, generally determined by diameter, generally less than about 1000 nm.

As used herein, the term "platelets" refers to individual layers of the layered material.

The inorganic nanoparticulate of the inorganic-organic nanocomposite can be natural or synthetic such as smectite clay, and should have certain ion exchange properties as in smectite clays, rectorite, vermiculite, illite, micas and their synthetic analogs, including laponite, synthetic mica-montmorillonite and tetrasilicic mica.

The nanoparticulates can possess an average maximum lateral dimension (width) in a first embodiment of between about 0.01 μm and about 10 μm, in a second embodiment between about 0.05 μm and about 2 μm, and in a third embodiment between about 0.1 μm and about 1 μm. The average maximum vertical dimension (thickness) of the nanoparticulates can in general vary in a first embodiment between about 0.5 nm and about 10 nm and in a second embodiment between about 1 nm and about 5 mn.

Useful inorganic nanoparticulate materials of the invention include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, micaceous minerals such as illite and mixed layered illite/smectite minerals such as rectorite, tarosovite, ledikite and admixtures of illites with one or more of the clay minerals named above. Any swellable layered material that sufficiently sorbs the organic molecules to increase the interlayer spacing between adjacent phyllosilicate platelets to at least about 5 angstroms, or to at least about 10 angstroms, (when the phyllosilicate is measured dry) can be used in producing the inorganic-organic nanocomposite of the invention.

The modified inorganic nanoparticulate of the invention is obtained by contacting quantities of layered inorganic particulate possessing exchangeable cation, e.g., $Na^+$, $Ca^{2+}$, $Al^{3+}$, $Fe^{2+}$, $Fe^{3+}$, and $Mg^{2+}$, with at least one ammonium-containing organopolysiloxane. The resulting modified particulate is an inorganic-organic nanocomposite possessing intercalated quaternary ammonium organopolysiloxane.

The ammonium-containing organopolysiloxane must contain at least one ammonium group and can contain two or more ammonium groups. The quaternary ammonium groups can be position at the terminal ends of the organopolysiloxane and/or along the siloxane backbone. One class of useful ammonium-containing organopolysiloxane has the general formula:

$$M_a D_b D'_c$$

wherein "a" is 2, and "b" is equal to or greater than 1 and "c" is zero or positive; M is $$[R^3_z NR^4]_{3-x-y} R^1_x R^2_y SiO_{1/2}$$

wherein "x" is 0, 1 or 2 and "y" is either 0 or 1, subject to the limitation that x+y is less than or equal to 2, "z" is 2, $R^1$ and $R^2$ each independently is a monovalent hydrocarbon group up to 60 carbons; $R^3$ is selected from the group consisting of H and a monovalent hydrocarbon group up to 60 carbons; $R^4$ a monovalent hydrocarbon group up to 60 carbons;
D is $$R^5 R^6 SiO_{2/2}$$

where $R^5$ and $R^6$ each independently is a monovalent hydrocarbon group up to 60 carbon atoms; and D' is $$R^7 R^8 SiO_{2/2}$$

where $R^7$ and $R^8$ each independently is a monovalent hydrocarbon group containing amine with the general formula:

$$[R^9_a NR^{10}]$$

wherein "a" is 2, $R^9$ is selected from the group consisting of H and a monovalent hydrocarbon group up to 60 carbons; $R^{10}$ is a monovalent hydrocarbon group up to 60 carbons.

In another embodiment of the present invention, the ammonium-containing organopolysiloxane is $R^{11} R^{12} R^{13} N$, wherein $R^{11}$, $R^{12}$, and $R^{13}$ each independently is an alkoxy silane or a monovalent hydrocarbon group up to 60 carbons. The general formula for the alkoxy silane is $$[R^{14} O]_{3-x-y} R^{15}_x R^{16}_y SiR^{17}$$

wherein "x" is 0, 1 or 2 and "y" is either 0 or 1, subject to the limitation that x+y is less than or equal to 2; $R^{14}$ is a monovalent hydrocarbon group up to 30 carbons; $R^{15}$ and $R^{16}$ are independently chosen monovalent hydrocarbon groups up to 60 carbons; $R^{17}$ is a monovalent hydrocarbon group up to 60 carbons. Additional compounds useful for modifying the inorganic component of the present invention are amine compounds or the corresponding ammonium ion with the structure $R^{18} R^{19} R^{20} N$, wherein $R^{18}$, $R^{19}$, and $R^{20}$ each independently is an alkyl or alkenyl group of up to 30 carbon atoms, and each independently is an alkyl or alkenyl group of up to 20 carbon atoms in another embodiment, which may be the same or different. In yet another embodiment, the organic molecule is a long chain tertiary amine where $R^{18}$, $R^{19}$ and $R^{20}$ each independently is a 14 carbon to 20 carbon alkyl or alkenyl.

The layered inorganic nanoparticulate compositions of the present invention need not be converted to a proton exchange form. Typically, the intercalation of a quaternary ammonium organopolysiloxane into the layered inorganic nanoparticulate material is achieved by cation exchange using solvent and solvent-free processes. In the solvent-based process, the organopolysiloxane ammonium component is placed in a solvent that is inert toward polymerization or coupling reaction. Particularly suitable solvents are water or water-ethanol, water-acetone and like water-polar co-solvent systems. Upon removal of the solvent, the intercalated particulate concentrates are obtained. In the solvent-free process, a high shear blender is usually required to conduct the intercalation reaction. The inorganic-organic nanocomposite may be in a suspension, gel, paste or solid forms.

A specific class of ammonium-containing organopolysiloxanes are those described in U.S. Pat. No. 5,130,396 the entire contents of which are incorporated by reference herein and can be prepared from known materials including those which are commercially available.

The ammonium-containing organopolysiloxanes of U.S. Pat. No. 5,130,396 is represented by the general formula:

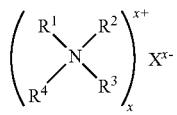
(I)

in which $R^1$ and $R^2$ are identical or different and represent a group of the formula:

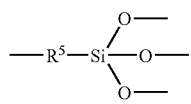
(II)

in which the nitrogen atoms in (I) are connected to the silicon atoms in (II) via the $R^5$ groups and $R^5$ represents an alkylene group with 1 to 10 carbon atoms, a cycloalkylene group with 5 to 8 atoms or a unit of the general formula:

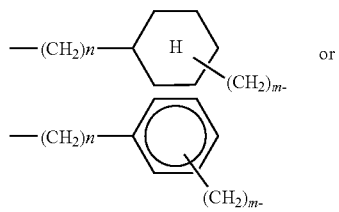

in which n is a number from 1 to 6 and indicates the number of methylene groups in nitrogen position and m is a number from 0 to 6 and the free valences of the oxygen atoms bound to the silicon atom are saturated as in silica skeletons by silicon atoms of other groups of formula (II) and/or with the metal atoms of one or more of the cross-linking binding links

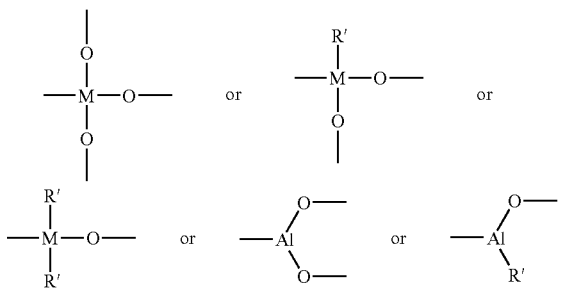

in which M is a silicon, titanium or zirconium atom and R' a linear or branched alkyl group with 1 to 5 carbon atoms and the ratio of the silicon atoms of the groups of formula (II) to the metal atoms in the binding links is 1:0 to 1:10 and in which $R^3$ is equal to $R^1$ or $R^2$, or hydrogen, or a linear or branched alkyl group of 1 to 20 carbon atoms, a cycloalkyl group of 5 to 8 carbon atoms or is the benzyl group, and $R^4$ is equal to hydrogen, or a linear or branched alkyl group with 1 to 20 carbon atoms or is a cycloalkyl, benzyl, alkyl, propargyl, chloroethyl, hydroxyethyl, or chloropropyl group consisting of 5 to 8 carbon atoms and X is an anion with the valence of x equal to 1 to 3 and selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexaflourophosphate, fonriate, acetate, propionate, oxalate, triflouroacetate, trichloroacetate or benzoate.

The ammonium-containing organopolysiloxane compounds described herein are macroscopically spherical shaped particles with a diameter of 0.01 to 3.0 mm, a specific surface area of 0 to 1000 $m^2$/g, a specific pore volume of 0 to 5.0 ml/g, a bulk density of 50 to 1000 g/l as well as a dry substance basis in relation to volume of 50 to 750 g/l.

One method of preparing an ammonium-containing organopolysiloxane involves reacting a primary, secondary, or tertiary aminosilane possessing at least one hydrolysable alkoxy group, with water, optionally in the presence of a catalyst, to achieve hydrolysis and subsequent condensation of the silane and produce amine-terminated organopolysilane which is thereafter quaternized with a suitable quarternizing reactant such as a mineral acid and/or alkyl halide to provide the ammonium-containing organopolysiloxane. A method of this type is described in aforesaid U.S. Pat. No. 5,130,396. In this connection, U.S. Pat. No. 6,730,766, the entire contents of which are incorporated by reference herein, describes processes for the manufacture of quaternized polysiloxane by the reaction of epoxy-functional polysiloxane.

In a variation of this method, the primary, secondary or tertiary aminosilane possessing hydrolysable alkoxy group(s) is quartemized prior to the hydrolysis condensation reactions providing the organopolysiloxane. For example, ammonium-containing N-trimethoxysilylpropyl-N,N,N-trimethylammonium chloride, N-trimethoxysilylpropyl-N,N,N-tri-n-butylammonium chloride, and commercially available ammonium-containing trialkoxysilane octadecyldimethyl(3-trimethyloxysilylpropyl)ammonium chloride (available from Gelest, Inc.) following their hydrolysis/condensation will provide ammonium-containing organopolysiloxane for use herein.

Other suitable tertiary aminosilane useful for preparing ammonium-containing organopolysiloxane include tris(triethoxysilylpropyl)amine, tris(trimethoxysilylpropyl)amine, tris(diethoxymethylsilylpropyl)amine, tris(tripropoxysilylpropyl)amine, tris(ethoxydimethylsilylpropyl)amine, tris(triethoxyphenylsilylpropyl)amine, and the like.

Still another method for preparing the ammonium-containing organopolysiloxane calls for quarternizing a primary, secondary, or tertiary amine-containing organopolysiloxane with quarternizing reactant. Useful amine-containing organopolysiloxanes include those of the general formula:

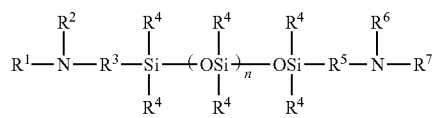

wherein $R^1$, $R^2$ $R^6$, and $R^7$ each independently is H, hydrocarbyl of up to 30 carbon atoms, e.g., alkyl, cycloalkyl, aryl, alkaryl, aralkyl, etc., or $R^1$ and $R^2$ together or $R^6$ and $R^7$ together form a divalent bridging group of up to 12 carbon atoms, $R^3$ and $R^5$ each independently is a divalent hydrocarbon bridging group of up to 30 carbon atoms, optionally containing one or more oxygen and/or nitrogen atoms in the chain, e.g., straight or branched chain alkylene of from 1 to 8 carbons such as —$CH_2$—, —$CH_2$ $CH_2$—, —$CH_2CH_2CH_2$—, —$CH_2$—$C(CH_3)$—$CH_2$—, —$CH_2CH_2CH_2$ $CH_2$—, etc., each $R^4$ independently is an alkyl group, and n is from 1 to 20 and advantageously is from 6 to 12.

These and similar amine-containing organopolysiloxanes can be obtained by known and conventional procedures e.g., by reacting an olefinic amine such as allyamine with a polydiorganosiloxane possessing Si—H bonds in the presence of a hydrosilation catalyst, such as, a platinum-containing hydrosilation catalyst as described in U.S. Pat. No. 5,026,890, the entire contents of which are incorporated by reference herein.

Specific amine-containing organopolysiloxanes that are useful for preparing the ammonium-containing organopolysiloxanes herein include the commercial mixture of

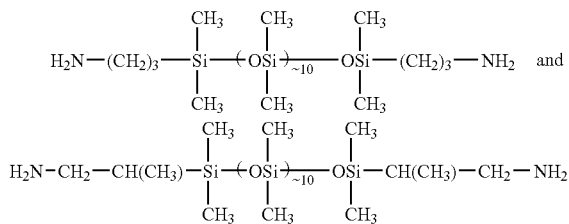

The inorganic-organic nanocomposites of the present invention are useful, inter alia, as the sole or partial filler for compositions comprising a solid polymer or mixture/blend of solid polymers.

Useful solid polymers include epoxy, polycarbonate, silicone, polyester, polyether, polyolefin, natural and synthetic rubber, polyurethane, nylon, polystyrene, polyvinylaromatic, acrylic, acrylate ester, polyamide, polyimide, phenolic, polyvinylhalide, polyphenylene oxide, polyketone, their copolymers and blends thereof. Copolymers include both random and block copolymers. Polyolefin resins include polybutylene, polypropylene and polyethylene, such as low density polyethylene, medium density polyethylene, high density polyethylene, and ethylene copolymers; polyvinylhalide resins include polyvinyl chloride polymers and copolymers and polyvinylidene chloride polymers and copolymers, fluoropolymers; polyvinylaromatic resins include polystyrene polymers and copolymers; acrylate resins include polymers and copolymers of acrylate and methacrylate esters, polyamide resins include nylon 6, nylon 11, and nylon 12, as well as polyamide copolymers and blends thereof, polyester resins include polyalkylene terephthalates, such as polyethylene terephthalate and polybutylene terephthalate, as well as polyester copolymers; synthetic rubbers include styrene-butadiene and acrylonitrile-butadiene-styrene copolymers and; polyketones include polyetherketones and polyetheretherketones.

In the resin-filled compositions of the invention, the inorganic-organic nanocomposite is present in an amount, of course, that enhances gas barrier properties therein. In a first embodiment, the inorganic-organic nanocomposite can be present at a level of up to about 90 weight percent, in a second embodiment at a level of up to about 50 weight percent, and third embodiment at a level of up to about 20 weight percent.

The inorganic-organic nanocomposite of this invention is also advantageously employed as a filler in compositions intended to function as gas barriers, e.g., compositions disclosed and claimed in applicant's co-pending application entitled "ROOM TEMPERATURE CUBABLE ORGANOPOLYSILOXANE COMPOSITION" filed of even date herewith, the contents of which are incorporated herein in their entirety.

The invention is illustrated by the following non-limiting example:

EXAMPLE 1

An inorganic-organic nanocomposite in accordance with the invention was prepared by first placing 10 g of amino propyl terminated siloxane ("GAP 10," siloxane length of 10, from GE Silicones, Waterford, USA) in a 100 ml single-necked round bottomed flask and adding 4 ml of methanol available from Merck. 2.2 ml of concentrated HCl was added very slowly with stirring. The stirring was continued for 10 minutes. 900 ml of water was added to a 2000 ml three-necked round-bottomed flask fitted with condenser and overhead mechanical stirrer. 18 g of Cloisite Na$^+$ (natural montmorillonite available from Southern Clay Products) clay was added to the water very slowly with stirring (stirring rate approximately 250 rpm). The ammonium chloride solution (prepared above) was then added very slowly to the clay-water mixture. The mixture was stirred for 1 hour and let stand overnight. The mixture was filtered through a Buckner funnel and the solid obtained was slurried with 800 ml of methanol, stirred for 20 minutes, and then the mixture was filtered. The solid was dried in oven at 80° C. for approximately 50 hours.

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. An inorganic-organic nanocomposite comprising at least one inorganic component which is a layered inorganic nanoparticulate and at least one organic component which is a quaternary ammonium-containing organopolysiloxane, wherein the quaternary ammonium groups are positioned at the terminal ends of the organopolysiloxane and along the siloxane backbone, and wherein the quaternary ammonium organopolysiloxane is obtained by hydrosilating a polydiorganosiloxane possessing Si-H bonds with allylamine in the presence of hydrosilation catalyst to provide amine-containing organopolysiloxane and thereafter quaternizing the amine-containing organopolysiloxane to obtain the quaternary ammonium organopolysiloxane.

2. The inorganic-organic nanocomposite of claim 1 wherein the layered inorganic nanoparticulate possesses exchangeable cations selected from the group of Na$^+$, Ca$^{2+}$, Al$^{3+}$, Fe$^{2+}$, Fe$^{3+}$, Mg$^{2+}$, and mixtures thereof.

3. The inorganic-organic nanocomposite of claim 1 wherein the layered nanoparticulate is at least one member selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikitekaolinite and, mixtures thereof.

4. The inorganic-organic nanocomposite of claim 1 wherein layered inorganic nanoparticulate has an average maximum lateral dimension of between about 0.01 μm and about 10 μm and an average maximum vertical dimension of between about 0.5 nm and about 10 nm.

5. A resin-filled composition comprising at least one solid synthetic resin and, as partial or total filler therefor, at least one inorganic-organic nanocomposite of claim 1.

6. The composition of claim 5 wherein the resin is at least one selected from the group consisting of epoxy, polycarbonate, silicone, polyester, polyether, polyolefin, natural and synthetic rubber, polyurethane, nylon, polystyrene, polyvinylaromatic, acrylic, acrylate ester polyamide, polyimide, phenolic, polyvinylhalide, polyphenylene oxide, polyketone, their copolymers and blends thereof.

7. The composition of claim 5 wherein the inorganic-organic nanocomposite is present therein at a level of up to about 90 weight percent.

8. An inorganic-organic nanocomposite comprising at least one inorganic component which is a layered inorganic nanoparticulate and at least one organic component which is a quaternary ammonium-containing organopolysiloxane, wherein the quaternary ammonium organopolysiloxane is at least one ammonium-containing diorganopolysiloxane having the formula:

wherein "a" is 2, and "b" is equal to or greater than 1 and "c" is positive; M is

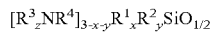

wherein "x" is 0, 1 or 2 and "y" is either 0 or 1, subject to the limitation that x +y is less than or equal to 2, "z" is 2, $R^1$ and $R^2$ each independently is a monovalent hydrocarbon group up to 60 carbons; $R^3$ is selected from the group consisting of H and a monovalent hydrocarbon group up to 60 carbons; R4 is a monovalent hydrocarbon group up to 60 carbons;

D is

where $R^5$ and $R^6$ each independently is a monovalent hydrocarbon group up to 60 carbon atoms; and D' is

where $R^7$ and $R^8$ each independently is a monovalent hydrocarbon group containing amine with the general formula:

wherein "a" is 2, $R^9$ is selected from the group consisting of H and a monovalent hydrocarbon group up to 60 carbons; $R^{10}$ is a monovalent hydrocarbon group up to 60 carbons.

9. A resin-filled composition comprising at least one solid synthetic resin and, as partial or total filler therefor, at least one inorganic-organic nanocomposite of claim 8.

10. The composition of claim 9 wherein the resin is at least one selected from the group consisting of epoxy, polycarbonate, silicone, polyester, polyether, polyolefin, natural and synthetic rubber, polyurethane, nylon, polystyrene, polyvinylaromatic, acrylic, acrylate ester polyamide, polyimide, phenolic, polyvinylhalide, polyphenylene oxide, polyketone, their copolymers and blends thereof.

11. The composition of claim 9 wherein the inorganic-organic nanocomposite is present therein at a level of up to about 90 weight percent.

12. An inorganic-organic nanocomposite comprising at least one inorganic component which is a layered inorganic nanoparticulate and at least one organic component which is a quaternary ammonium-containing organopolysiloxane, wherein the quaternary ammonium groups are positioned at the terminal ends of the organopolysiloxane and along the siloxane backbone, and wherein the quaternary ammonium organopolysiloxane is obtained by reacting an aminosilane possessing at least one hydrolysable group selected from the group consisting of tris(triethoxysilylpropyl)amine, tris(trimethoxysilylpropyl)amine, tris(diethoxymethylsilylpropyl)amine, tris(tripropoxysilylpropyl)amine, tris(ethoxydimethylsilylpropyl)amine, and tris(triethoxyphenylsilylpropyl)amine with water under hydrolysis/condensation conditions to provide amine-containing organopolysiloxane and thereafter quaternizing the amine-containing organopolysiloxane to provide the quaternary ammonium organopolysiloxane.

13. A resin-filled composition comprising at least one solid synthetic resin and, as partial or total filler therefor, at least one inorganic-organic nanocomposite of claim 12.

14. The composition of claim 13 wherein the resin is at least one selected from the group consisting of epoxy, polycarbonate, silicone, polyester, polyether, polyolefin, natural and synthetic rubber, polyurethane, nylon, polystyrene, polyvinylaromatic, acrylic, acrylate ester polyamide, polyimide, phenolic, polyvinylhalide, polyphenylene oxide, polyketone, their copolymers and blends thereof.

15. The composition of claim 13 wherein the inorganic-organic nanocomposite is present therein at a level of up to about 90 weight percent.

16. An inorganic-organic nanocomposite comprising at least one inorganic component which is a layered inorganic nanoparticulate and at least one organic component which is a quaternary ammonium-containing organopolysiloxane, wherein the quaternary ammonium groups are positioned at the terminal ends of the organonolysiloxane and along the siloxane backbone, and wherein the quaternary ammonium organopolysiloxane is obtained by reacting an aminosilane possessing at least one hydrolysable group with a quaternizing reactant selected from the group consisting of a mineral acid and alkyl halide to provide an ammonium-containing N-trimethoxysilylpropyl-N,N,N-trimethylammonium chloride, N-trimethoxysilylpropyl-N,N,N-tri-n-butylammonium chloride, or trialkoxysilane octadecyldimethyl(3-trimethyloxysilylpropyl) ammonium chloride and subsequently with water under hydrolysis/condensation conditions to obtain the quaternary ammonium organopolysiloxane.

17. A resin-filled composition comprising at least one solid synthetic resin and, as partial or total filler therefor, at least one inorganic-organic nanocomposite of claim 16.

18. The composition of claim 17 wherein the resin is at least one selected from the group consisting of epoxy, polycarbonate, silicone, polyester, polyether, polyolefin, natural and synthetic rubber, polyurethane, nylon, polystyrene, polyvinylaromatic, acrylic, acrylate ester polyamide, polyimide, phenolic, polyvinylhalide, polyphenylene oxide, polyketone, their copolymers and blends thereof.

19. The composition of claim 17 wherein the inorganic-organic nanocomposite is present therein at a level of up to about 90 weight percent.

20. A method of preparing an inorganic-organic nanocomposite comprising the steps of:
   a) reacting an aminosilane possessing at least one hydrolyzable alkoxy group with water, optionally, in the presence of catalyst, to provide an amine-containing organopolysiloxane;

b) quaternizing the amine-containing organopolysiloxane to provide a quaternized ammonium-containing organopolysiloxane, wherein the quaternary ammonium groups are positioned at the terminal ends of the organopolysiloxane and along the siloxane backbone; and, c) combining the quaternized ammonium-containing organopolysiloxane with a layered inorganic nanoparticulate possessing exchangeable cation to provide the inorganic-organic nanocomposite.

21. The method of claim 20 wherein the aminosilane is a primary, secondary or tertiary aminosilane possessing at least one hydrolyzable alkoxy group.

22. The method of claim 20 wherein the catalyst is a selected from the group consisting of organometallic compounds, acids, bases, and mixtures thereof.

23. The inorganic-organic nanocomposite obtained by the method of claim 22.

24. The method of claim 20 wherein the amine-containing organopolysiloxane is quaternized with mineral acid, alkyl halide, or mixture thereof.

25. The inorganic-organic nanocomposite obtained by the method of claim 24.

26. The inorganic-organic nanocomposite obtained by the method of claim 20.

27. The inorganic-organic nanocomposite obtained by the method of claim 21.

28. A composition comprising at least one solid synthetic resin and, as partial or total filler therefor, at least one inorganic-organic nanocomposite obtained by the method of claim 20.

29. The composition of claim 28 wherein the resin is at least one of epoxy, polycarbonate, silicone, polyester, polyether, polyolefin, natural and synthetic rubber, polyurethane, nylon, polystyrene, polyvinylaromatic, acrylic, acrylate ester polyamide, polyimide, phenolic, polyvinylhalide, polyphenylene oxide, polyketone, their copolymers and blends thereof.

30. The composition of claim 28 wherein the inorganic-organic nanocomposite is present therein at a level of up to about 90 weight percent.

31. An inorganic-organic nanocomposite comprising at least one inorganic component which is a layered inorganic nanoparticulate and at least one organic component which is a quaternary ammonium-containing organopolysiloxane, wherein the quaternary ammonium-containing organopolysiloxane is represented by the general formula:

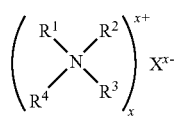
(I)

in which $R^1$ and $R^2$ are identical or different and represent a group of the formula:

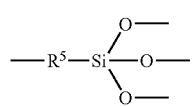
(II)

in which the nitrogen atoms in (I) are connected to the silicon atoms in (II) via the $R^5$ groups and $R^5$ represents an alkylene group with 1 to 10 carbon atoms, a cycloalkylene group with 5 to 8 atoms or a unit of the general formula:

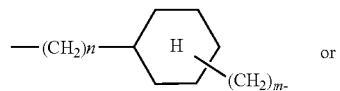

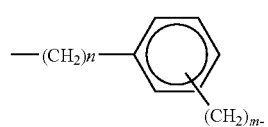

in which n is a number from 1 to 6 and indicates the number of methylene groups in nitrogen position and m is a number from 0 to 6 and the free valences of the oxygen atoms bound to the silicon atom are saturated as in silica skeletons by silicon atoms of other groups of formula (II) and/or with the metal atoms of one or more of the cross-linking binding links

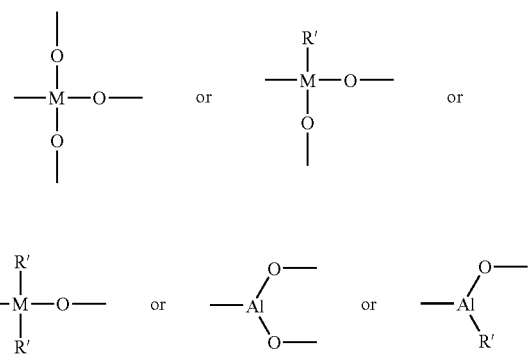

in which M is a silicon, titanium or zirconium atom and R' a linear or branched alkyl group with 1 to 5 carbon atoms and the ratio of the silicon atoms of the groups of formula (II) to the metal atoms in the binding links is 1:0 to 1:10;

$R^3$ is $R^1$ or $R^2$ or hydrogen, or a linear or branched alkyl group of 1 to 20 carbon atoms, a cycloalkyl group of 5 to 8 carbon atoms or is a benzyl group;

$R^4$ is hydrogen, or a linear or branched alkyl group with 1 to 20 carbon atoms or is a cycloalkyl, benzyl, alkyl, propargyl, chloroethyl, hydroxyethyl, or chloropropyl group consisting of 5 to 8 carbon atoms; and X is an anion with the valence of x equal to 1 to 3 and is selected from the group consisting of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexaflourophosphate, formate, acetate, propionate, oxalate, triflouroacetate, trichloroacetate, and benzoate.

32. A resin-filled composition comprising at least one solid synthetic resin and, as partial or total filler therefor, at least one inorganic-organic nanocomposite of claim 31.

33. The composition of claim 32 wherein the resin is at least one selected from the group consisting of epoxy, polycarbonate, silicone, polyester, polyether, polyolefin, natural and synthetic rubber, polyurethane, nylon, polystyrene, polyvinylaromatic, acrylic, acrylate ester polyamide, polyimide, phenolic, polyvinylhalide, polyphenylene oxide, polyketone, their copolymers and blends thereof.

34. The composition of claim 32 wherein the inorganic-organic nanocomposite is present therein at a level of up to about 90 weight percent.

* * * * *